May 8, 1962 R. L. KONIGSBERG 3,034,044
ELECTRICAL BRIDGE
Filed Dec. 4, 1957

ROBERT L. KONIGSBERG
INVENTOR

BY
ATTORNEYS 2,034,044
ELECTRICAL BRIDGE
Robert L. Konigsberg, Baltimore, Md., assignor to the United States of America as represented by the Secretary of the Navy
Filed Dec. 4, 1957, Ser. No. 700,729
3 Claims. (Cl. 324—57)

The present invention relates to an electrical bridge; more particularly it relates to an improved low frequency bridge of the operational type, useful for the measurement of high capacitances with small dissipation factors.

In certain control system applications operational amplifiers are employed in integrating circuits at very low frequencies. The integrating network generally consists of a resistance in series with the amplifier input and a capacitor connected between amplifier output and input. Capacitance values in the network may be relatively high, for example up to 30 mfd. in some applications. For accurate results it is desirable to be cognizant of the low frequency (.05 to 10 c.p.s.) performance and the temperature characteristics of the integrating capacitor.

The principal object of the present invention therefore, is to provide an electrical bridge, which will permit measurements of capacitances (or resistances) at very low frequencies and with a high degree of accuracy.

Another important object of the invention is to provide an electrical bridge which will afford high output current sensitivity at bridge balance especially at low frequencies where the conventional four arm passive bridge is relatively insensitive.

Another object resides in the provision of an electrical bridge which will be D.C. stabilized in use, particularly during low frequency measurements.

As further objects, the invention provides an electrical bridge wherein the inherent noise is maintained at a low level and does not affect settings for bridge balance, and in which distortion is maintained at an insignificant level.

Another object of the invention is to provide an electrical bridge which, with certain modifications, may be used for accurately measuring high values of inductance.

And the invention provides, as a further object, an electrical bridge which may be adapted for producing accurate measurements of resistance and temperature coefficients of resistance in the very low frequency range (.05 to 10 c.p.s.).

Other objects and many of the attendant advantages of this invention will be readily appreciated as the same becomes better understood by reference to the following detailed description when considered in connection with the accompanying drawings, wherein.

Figure 1:
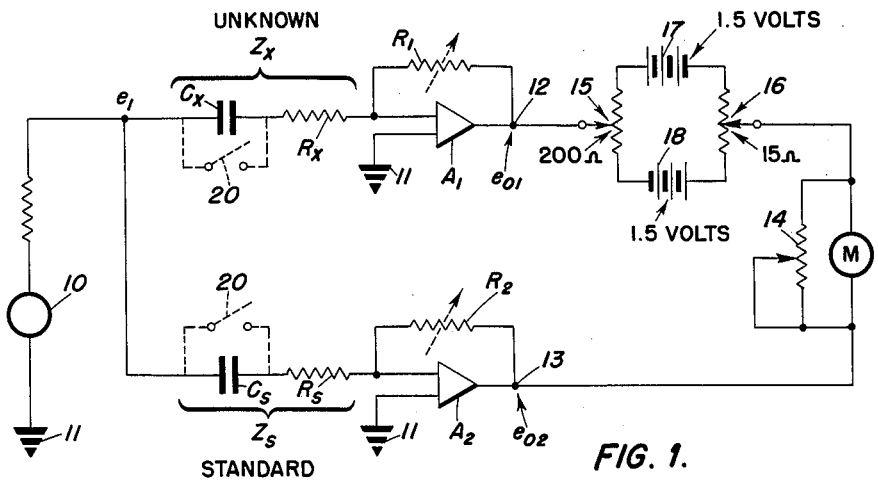
FIG. 1 is a circuit schematic of the improved electrical bridge constituting the present invention.

Referring to the drawings and first to FIG. 1 a source of low frequency voltage such as a signal generator, is shown at 10. One terminal of the signal generator is connected to ground, as designated at 11.

One arm of the improved bridge includes the unknown impedance $Z_x$ which is constituted by a capacitor $C_x$ and a resistor $R_x$, connected in series. The adjacent arm of the bridge includes a known value (standard) capacitor $C_s$ and a variable resistor $R_s$, also of known range, connected in series. The input from the signal generator is connected to the junction of the adjacent bridge arms, just described, at point $e_1$. The arm of the bridge which includes the unknown impedance also includes an operational amplifier $A_1$ which is shunted by a variable resistor $R_1$, the amplifier having a terminal connected to ground 11. Similarly, the arm of the bridge including the known impedance also includes an operational amplifier $A_2$ which is shunted by a resistor $R_2$, the amplifier $A_2$ also having a terminal connected to ground. A meter M is connected to the junctions 12 and 13, that is to the operational amplifier outputs, and is shunted by a suitable meter sensitivity control, shown as a potentiometer 14. Any initial D.C. unbalance between amplifier outputs, which is generally in the millivolt region, may be compensated for by adjustment of potentiometers 15 and 16. More specifically, the resistor elements of the potentiometers 15 and 16 are connected in series relation with batteries 17 and 18, as shown in FIG. 1, with the arm of the potentiometer 15 connected to the junction 12 and the arm of the potentiometer 16 connected to a terminal of the meter M. Bridge A.C. balance is obtained by varying resistors $R_1$ and $R_s$.

The bridge balance equation may be arrived at in the following manner (refer to FIG. 1). It can be shown, using Kirchoff's laws and assuming the output loop open circuited, that (1) $$\frac{e_{o1}}{e_1} = -\left(\frac{R_1}{Z_x}\right)K_1$$

(2) $$\frac{e_{o2}}{e_1} = -\left(\frac{R_2}{Z_s}\right)K_2$$

Where:

Subscripts 1, 2 refer to respective bridge branches
$e_{o1}$=output at junction 12
$e_1$=input (signal generator output)
$e_{o2}$=output at junction 13
$R_1$, $R_2$=values of the resistors $R_1$, $R_2$
$Z_x$=unknown impedance ($R_x+1/j\omega C_x$)
$Z_s$=standard impedance ($R_s+1/j\omega C_s$)
$K_1$ (or $K_2$)=constant which approaches unity as the gain of amplifier $A_1$ (or $A_2$) increases, as output impedance of amplifier $A_1$ (or $A_2$) becomes zero and as input impedance approaches infinity.

At bridge A.C. balance, indicated by zero deflection of the output meter M, (3) $$\frac{e_{o1}}{e_1} = \frac{e_{o2}}{e_1}$$

Substituting Equations 1 and 2 in Equation 3, assuming $K_1$ and $K_2$ are both unity and equating real and imaginary terms, solving for $R_x$ and $C_x$:

(4) $$R_x = \frac{R_1}{R_2}R_s$$

(5) $$C_x = \frac{R_2}{R_1}C_s$$

The effectiveness of Equations 4 and 5 for calculating the unknown resistance ($R_x$) and the unknown capacity ($C_x$) is related to the gain of the operational amplifiers $A_1$ and $A_2$. In general, accuracy will improve as amplifier gain increases, as output impedance decreases and as input impedance approaches infinity. In a test experiment the gain of the amplifiers $A_1$ and $A_2$ was of the order of 100,000 at .05 c.p.s., falling off to about 1,000 at 10 c.p.s. This decrease in gain had a second order effect on accuracy of the measurement of capacitance and a first order effect on the accuracy of measurement of the dissipation factor (the dissipation factor $$d_x = \omega R_x C_x = \omega R_s C_s = d_s$$

where $d_s$=dissipation factor in the standard arm of the bridge and $\omega$=angular frequency).

Dissipation factor measurement accuracy deteriorates at 10 c.p.s. and may become as high as 50%. However, an overall capacitance measurement accuracy of ± 25% is readily achievable in the .05 to 10 c.p.s. range while accuracies of the order of 5% can be realized for dissipation factor in the .05 to 2 c.p.s. range.

Accuracy of a bridge constructed as described hereinabove is limited only by the following factors, assuming that the standard impedance is known accurately: (a) gain, input and output impedances of the operational amplifiers; (b) the relative magnitudes of stray impedances; (c) the ratio of the respective changes in metered output current to changes in the parameters (in values of resistors $R_1$ and $R_s$) about the bridge balance point, (i.e., bridge balance sensitivities); (d) the inherent noise introduced into the metering circuit by the operational amplifiers $A_1$ and $A_2$; (e) the purity of waveform of the signal generator and the linearity of the amplifiers; (g) the effect of "impure" resistors $R_1$ and $R_2$, i.e., whether or not said resistors possess reactive components.

Figure 2:
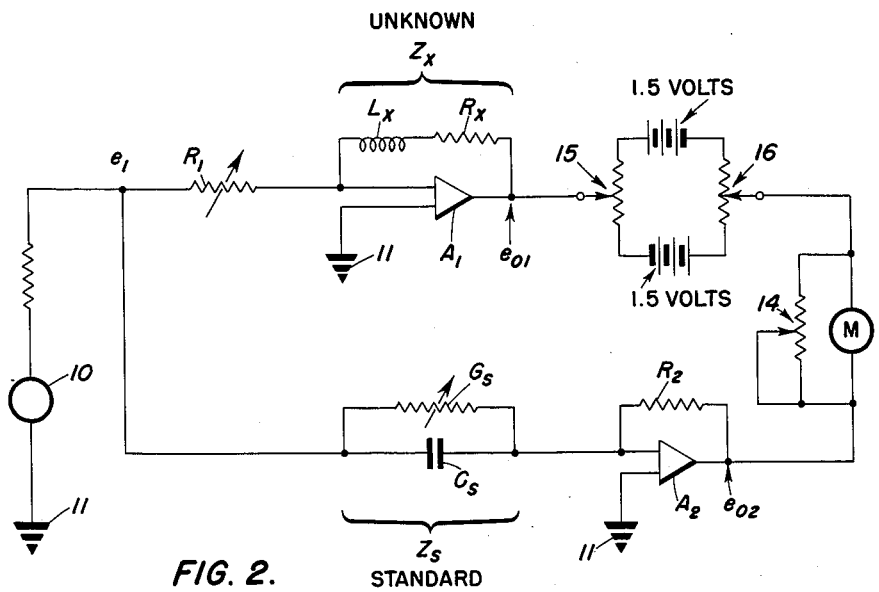
FIG. 2 is a circuit schematic of the invention modified to permit the measurement of inductance.

The value of an unknown inductor, shown at $Z_x$ in FIG. 2, may be determined by the use of the improved bridge circuit. More specifically, in FIG. 2, the inductor $Z_x$, which consists of the inductance $L_x$ in series with its loss component $R_x$, both of unknown value, is connected in shunt across the amplifier $A_1$. For the embodiment shown in FIG. 2 the bridge balance equation may be arrived at in a manner generally similar to the equation for FIG. 1, as follows:

(6) $$\frac{e_{o1}}{e_1} = -\left(\frac{Z_x}{R_1}\right)K_3$$

(7) $$\frac{e_{o2}}{e_1} = -\left(\frac{R_2}{Z_s}\right)K_4$$

Where $K_3$, $K_4$ are constants which are functions of gain, input impedance and output impedance of the amplifiers $A_1$, $A_2$ ($K_3$, $K_4$ approach unity as gain increases).

At bridge A.C. balance, indicated by zero deflection of the output meter M:

(8) $$\frac{e_{o1}}{e_1} = \frac{e_{o2}}{e_1}$$

Substituting equations 6 and 7 in 8, assuming constants $K_3$, $K_4$ are both unity and solving for $R_x$ and $L_x$.

$$R_x = R_1 R_2 G_s \quad (G_s = \text{conductance standard})$$
$$L_x = R_1 R_2 C_s$$

Where
$$Z_s = \frac{1}{G_s + j\omega C_s}$$

and
$$Z_x = R_x + j\omega L_x$$

By altering the circuit slightly so that all bridge arms are resistive, the improved bridge may be adapted for making accurate measurements of resistance and temperature coefficients of resistance (in the .05 to 10 c.p.s.). As shown in dotted lines in FIG. 1, the only alterations necessary are short-circuiting switches 20 for the capacitors $C_x$ and $C_s$. For resistance measurements the resistor $R_1$ becomes a constant and the resistor $R_x$ the only unknown. The equations for resistance measurements are:

(9) $$\frac{e_{o1}}{e_1} = -\left(\frac{R_1}{R_x}\right)K_5$$

(10) $$\frac{e_{o2}}{e_1} = -\left(\frac{R_2}{R_s}\right)K_6$$

Where $K_5$ and $K_6$ are constants similar to the constants $K_3$ and $K_4$.

Again, at bridge balance (A.C.), indicated by zero deflection of the output meter M:

(11) $$\frac{e_{o1}}{e_1} = \frac{e_{o2}}{e_1}$$

Substituting equations 9 and 10 in Equation 11 and solving for $R_x$:

(12) $$R_x = R_s \frac{R_1}{R_2}$$

Obviously many modifications and variations of the present invention are possible in the light of the above teachings. It is therefore to be understood that within the scope of the appended claims the invention may be practiced otherwise than as specifically described.

What is claimed is:

1. An electrical bridge for measuring impedances, comprising a pair of parallel arms, the first arm of which includes a first stabilized high gain analog type D.C. amplifier having the unknown impedance connected to the amplifier input and a first known variable resistor connected from the amplifier output to said input, the second arm of said parallel arms including a second stabilized high gain analog type D.C. amplifier having a known impedance connected to its input and a second known variable resistor connected from its output to its input, said parallel arms having a common input terminal for receiving a low frequency alternating test voltage, and current balance indicating means connected from the output of said first amplifier to the output of said second amplifier, said balance indicating means including a pair of potentiometers, and a pair of batteries coupled in series relation with the resistor elements of said potentiometers, said potentiometers having their movable contacts connected to the output of said amplifiers.

2. An electrical bridge for measuring capacitance comprising a pair of parallel arms, the first arm of which includes a first stabilized high gain analog type D.C. amplifier having the unknown capacitor connected to the amplifier input and a first known variable resistor connected from the amplifier output to said input, the second arm of said parallel arms including a second stabilized high gain analog type D.C. amplifier having a standard impedance connected to the input thereof and a second known variable resistor connected from the output thereof to said second amplifier input, said standard impedance including a known capacitor and a third known resistor, said parallel arms having a common input terminal connected to a low frequency alternating test voltage source, and balance indicating means connected from the output of said first amplifier to the output of said second amplifier, said balance indicating means including a pair of potentiometers, a pair of batteries coupled to the resistor elements of said potentiometers in series relation, said potentiometers having their movable contacts connected to the output of said amplifiers.

3. An electrical bridge for measuring inductance, comprising a pair of parallel arms, the first arm of which includes a first high gain analog type D.C. amplifier having a first known variable resistor connected to the input thereof and the unknown inductor connected from the output to said amplifier input, the second arm of said parallel arms including a second high gain analog type D.C. amplifier having a standard impedance connected to the input thereof and a second known resistor connected from said second amplifier output to its input, said standard impedance including a known capacitor and a known variable resistor, said first and second arms being joined at a common input terminal which is connected to a low frequency alternating test voltage source, and current balance indicating means connected from the output of said first amplifier to the output of said second amplifier, said balance indicating means including a pair of potentiometers, a pair of batteries coupled to the resistor elements of said potentiometers in series relation, said potentiometers having their movable contacts connected to the output of said amplifiers.

References Cited in the file of this patent

References Cited in the file of this patent

UNITED STATES PATENTS

| | | |
|---|---|---|
| 2,215,805 | Wills | Sept. 24, 1940 |
| 2,499,953 | Herzog | Mar. 7, 1950 |
| 2,507,324 | Taborsky | May 9, 1950 |
| 2,638,512 | Bessey | May 12, 1953 |
| 2,659,861 | Branson | Nov. 17, 1953 |
| 2,695,987 | McCollom et al. | Nov. 30, 1954 |
| 2,719,262 | Bousman | Sept. 27, 1955 |
| 2,925,554 | Hayes | Feb. 16, 1960 |